United States Patent
O'brien et al.

(10) Patent No.: US 8,707,079 B2
(45) Date of Patent: Apr. 22, 2014

(54) METHOD AND APPARATUS FOR TRANSMITTING DATA

(75) Inventors: Michael O'brien, Youghal (IE); Paul Kelleher, Aherla (IE); Conor O'keeffe, Douglas (IE)

(73) Assignee: Freescale Semiconductor, Inc., Austin, TX (US)

( * ) Notice: Subject to any disclaimer, the term of this patent is extended or adjusted under 35 U.S.C. 154(b) by 302 days.

(21) Appl. No.: 13/061,967

(22) PCT Filed: Sep. 4, 2008

(86) PCT No.: PCT/IB2008/053592
§ 371 (c)(1),
(2), (4) Date: Mar. 3, 2011

(87) PCT Pub. No.: WO2010/026446
PCT Pub. Date: Mar. 11, 2010

(65) Prior Publication Data
US 2011/0167185 A1    Jul. 7, 2011

(51) Int. Cl.
| G06F 1/00 | (2006.01) |
| G06F 13/14 | (2006.01) |
| H04B 15/00 | (2006.01) |
| H04B 1/04 | (2006.01) |

(52) U.S. Cl.
USPC .......... 713/501; 713/500; 455/62; 455/114.1; 710/305

(58) Field of Classification Search
USPC .................. 710/305; 713/500–503, 600–601; 455/62, 63.1, 63.3, 114.2, 114.1
See application file for complete search history.

(56) References Cited

U.S. PATENT DOCUMENTS

| 5,307,372 | A |   | 4/1994 | Sawyer et al. |
| 5,745,848 | A | * | 4/1998 | Robin ........................... 455/296 |
| 5,926,514 | A | * | 7/1999 | Meador et al. ................ 375/346 |
| 6,999,723 | B2 | * | 2/2006 | Kusbel et al. ................ 455/63.1 |
| 2003/0198307 | A1 | * | 10/2003 | Neill et al. .................... 375/346 |
| 2005/0265486 | A1 | * | 12/2005 | Crawley ........................ 375/326 |
| 2008/0081586 | A1 | * | 4/2008 | Sreerama et al. ............. 455/255 |
| 2008/0137787 | A1 | * | 6/2008 | Soffer .......................... 375/346 |

(Continued)

FOREIGN PATENT DOCUMENTS

| GB | 2349006 A | 10/2000 |
| WO | 2005/041164 A | 5/2005 |
| WO | 2006/027025 A | 3/2006 |

OTHER PUBLICATIONS

Fogg A: "DigRF Baseband/RF Digital Interface Specification" Internet Citation, [Online] Retrieved from the Internet: URL: http://146.101.169.51/DigRF%20Standard%20v112.pdf [retreived on Feb. 20, 2004] the whole document (XP002325710).

(Continued)

*Primary Examiner* — Thomas J Cleary (57) ABSTRACT

A semiconductor device comprising an interface logic module for transmitting data frames across an interface, and controller logic module arranged to control a rate at which the interface logic transmits data across the interface. Upon receipt of data frames to transmit across the interface, the controller logic module is arranged to determine a sequence of data rates with which to transmit sequential data frames across the interface, and to configure the transmission of the data frames across the interface according to the determined data rate sequence. The selection of these data rates will be dependent on specific critical RF frequencies where EMI impacts have to be minimized.

20 Claims, 4 Drawing Sheets

(56) References Cited

U.S. PATENT DOCUMENTS

| | | | |
|---|---|---|---|
| 2008/0240313 A1* | 10/2008 | Deisher et al. | 375/346 |
| 2009/0080583 A1* | 3/2009 | Skinner et al. | 375/371 |
| 2009/0138745 A1* | 5/2009 | Dorsey et al. | 713/501 |
| 2010/0137025 A1* | 6/2010 | Tal et al. | 455/553.1 |
| 2011/0051700 A1* | 3/2011 | Geiger et al. | 370/338 |

OTHER PUBLICATIONS

International Search Report and Written Opinion correlating to PCT/IB2008/053592 dated Jun. 5, 2009.

* cited by examiner

METHOD AND APPARATUS FOR TRANSMITTING DATA

FIELD OF THE INVENTION

This invention relates to a method and apparatus for transmitting data, and in particular for transmitting data frames across a high speed interface.

BACKGROUND OF THE INVENTION

High Speed serial interfaces span many standardisation efforts; these include the DigRF/M-PHY interface developed by the Mobile Industry Processor Interface (MIPI) Alliance, Universal Serial Bus (USB) interface, serial Rapid Input Output (sRIO) bus interface, Common Public Radio Interface (CPRI), Open Base Station Architecture Initiative (OBSAI) interfaces, etc. Key requirements for such high speed interfaces include high baud rates with minimal power consumption, low bit error rate and minimal Electromagnetic Interference (EMI). Many electronic products that include high-speed serial interfaces also contain wireless functionality. A mobile telephone device is one such example. Mitigating the effect of high-speed serial communication generated interference, as caused to the receiver or transmitter functionality, is paramount to the effective operation of the wireless functionality.

The MIPI developed M-PHY interface configured in DigRF mode is a high speed interface comprising requirements for EMI that are particularly sensitive, due to the fact that the interface is connecting the radio frequency integrated circuit (RFIC) transceiver device and the baseband processor integrated circuit (BBIC) within a communication device. The RFIC transceiver device in a mobile phone processes the low level signals received from the air-interface. In a DigRF M-PHY interface, there is a requirement for more than 1 Gbs on the downlink from the RFIC to the BBIC and greater than 832 Mbps on the uplink from the BBIC to the RFIC for some 3GPP LTE ($3^{rd}$ Generation Partnership Project Long Term Evolution) use case examples.

The proliferation of embedded clock schemes such as 8b10b coding in serial interfaces to facilitate clock data recovery also has an undesired consequence of shaping the resultant spectrum. The frequency lobes generated are maximally flat across the spectrum with nulls only at the baud frequency. Data streams without embedded clocks encoded tend to have more roll off at higher frequencies such that the RF spectrum exhibits a SING profile. Typically, the baud rate needed to meet the increased data throughput requirements would be such that data transmitted at these rates would result in a RF spectrum of the data signal that could interfere significantly with critical RF channel frequencies. Furthermore, as the baud rate is increased, the noise impact can become more significant.

One possible solution to this problem is to use more than one data path. In this manner, data may be transmitted at a lower data rate over a plurality of lanes, thus providing the required high data throughput whilst maintaining a low baud rate. However, increasing the number of data paths requires an increase in the number of data pins of the respective integrated circuits and semiconductor devices. As will be appreciated, increasing the number of pins results in an increase in the power consumption (due to the need to drive each pin) and complexity in terms of synchronising and time controlling the data paths. Furthermore, each additional path increases the composite noise by 3 dB. Accordingly, there is a trade-off between the number of data paths, with their inherent power and complexity costs and composite noise increases, and the interference caused by higher baud rates.

SUMMARY OF THE INVENTION

Embodiments of the invention provide a semiconductor device, a wireless communication unit and a method for transmitting data frames across an interface as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 1:
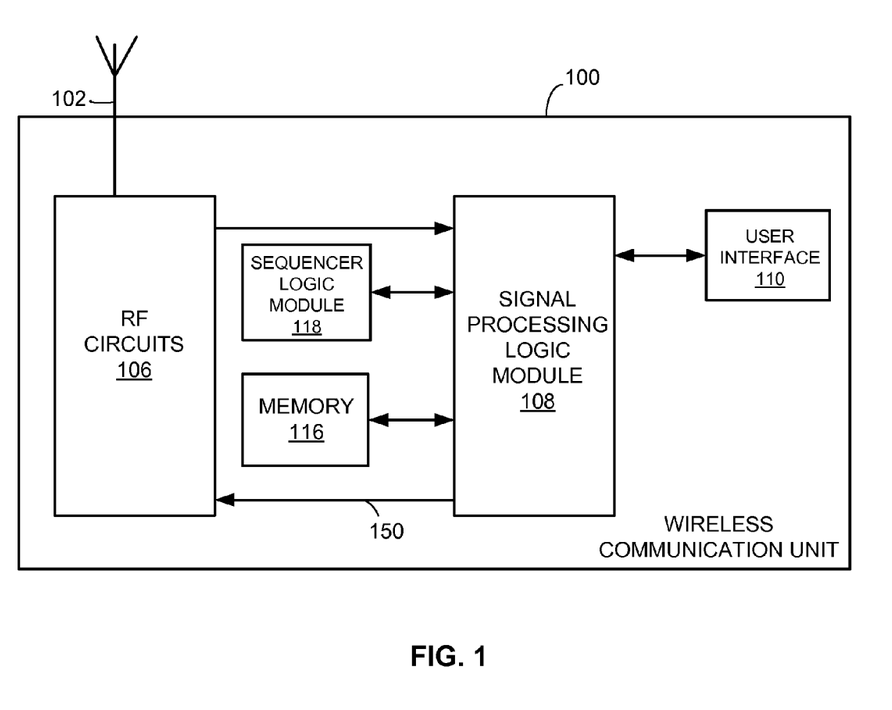
FIG. 1 illustrates an example of a block diagram of part of an example of a wireless communication unit.

Referring to FIG. 1, there is illustrated an example of a block diagram of part of an example of a wireless communication unit 100. The wireless communication unit 100, in the context of the illustrated embodiment, comprises a mobile telephone handset comprising an antenna 102. As such, the wireless communication unit 100 contains a variety of well known radio frequency (RF) components or circuits 106, operably coupled to the antenna 102 that will not be described further herein. The wireless communication unit 100 further comprises baseband circuitry, which for the illustrated embodiment is in a form of signal processing logic module 108. An output from the signal processing logic module 108 is provided to a suitable user interface 110 comprising, for example, a display, keypad, loudspeaker and/or microphone.

The signal processing logic module 108 is coupled to a memory element 116 that stores computer-readable code for programming the signal processing logic module 108, for example operating regimes, such as decoding/encoding functions and the like and may be realised in a variety of technologies such as random access memory (RAM) (volatile), (non-volatile) read only memory (ROM), Flash memory or any combination of these or other memory technologies. A sequencer logic module 118 is typically coupled to the signal processing logic module 108 to control the timing of operations within the wireless communication unit 100.

As previously mentioned to implement the LTE (Long Term Evolution) air interface standards require a net serial data throughput across an uplink interface 150 between the baseband circuitry, comprising signal processing logic module 108, and the RF circuitry 106 of greater than 832 MBps, in order to meet the proposed requirements.

Figure 2:
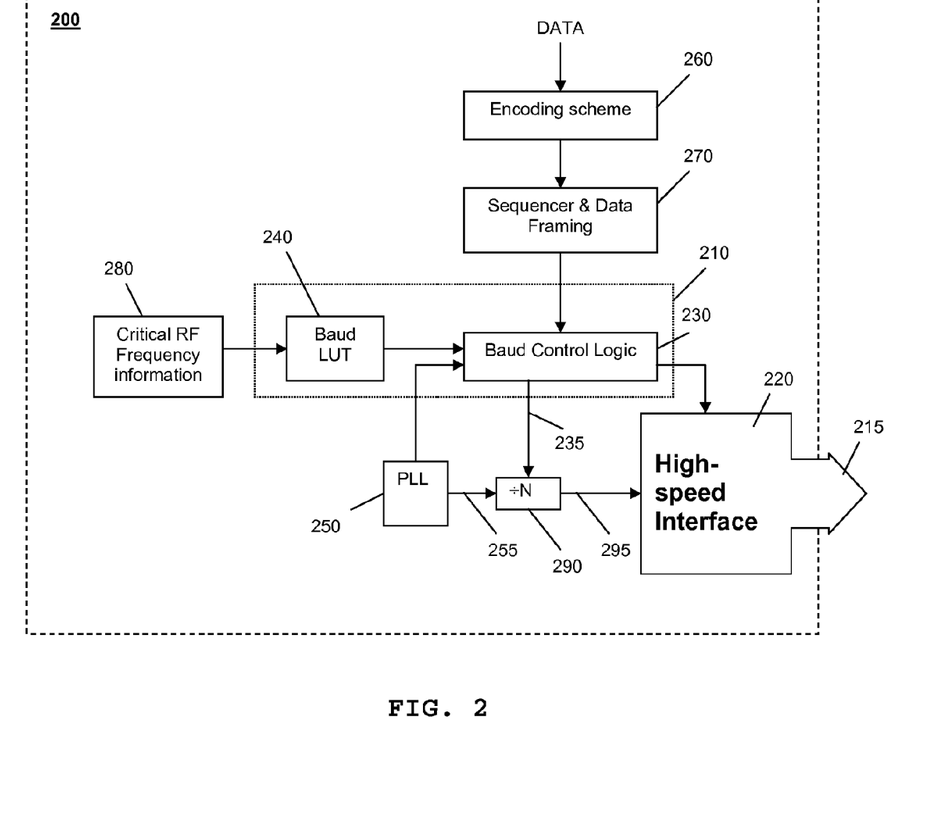
FIG. 2 illustrates an example of a semiconductor device 200.

Referring now to FIG. 2, there is illustrated an example of a semiconductor device 200 comprising interface logic module 220 for transmitting data frames across an interface 215, such as a high-speed uplink interface between baseband circuitry and RF circuitry, and controller logic module 210 arranged to control a rate at which the interface logic module 220 transmits data across the interface 215. For the illustrated embodiment, the semiconductor device 220 further comprises encoding logic module 260 and sequencer and framing logic module 270. The encoding logic module 260 is arranged to receive data to be transmitted across the interface 215, and to encode the data, for example using 8 bit/10 bit encoding. The sequencer and framing logic module 270 sequences the encoded data bits, and divides the sequenced and encoded data bits into frames, for example comprising 256 data bits, for transmission across the interface 215. The data frames are then provided to the controller logic module 210.

Upon receipt of data frames to transmit across the interface 215, the controller logic module 210 is arranged to determine a sequence of data rates with which to transmit sequential data frames across the interface 215, and to configure the transmission of the data frames across the interface 215 according to the determined data rate sequence.

In this manner, sequential data frames may be transmitted across the interface 215 at varying data rates. As a result, the frequency spectrum of the data signal on the interface 215 may be managed, by managing the data rate sequence, thus allowing potential interference to RF signals and the like to also be managed. In particular, interference caused to a critical RF channel frequency due to EMI (electromagnetic interference) from the transmission of data frames across the interface may be reduced by substantially avoiding transmitting data frames at data rates comprising a period similar to that of a critical RF channel frequency, whilst maintaining a high data throughput without transmitting data at significantly high data rates for prolonged periods of time.

For the illustrated example of a embodiment, the controller logic module 210 is arranged to determine the data rate sequence based on a critical frequency, for example a critical RF channel frequency. Accordingly, the controller logic module 210 of FIG. 2 is arranged to receive critical RF frequency information 280. In accordance with some example of a embodiments of the invention, a wireless communication unit, such as the mobile telephone handset 100 of FIG. 1, is capable of operating over a range of RF channels. Thus, the controller logic 210 may be arranged to receive information, for example from a central processing unit (not shown) or the like, identifying the RF receiver channel that the wireless communication unit is currently operating on. Such information may comprise a value representative of an actual frequency of the RF channel, or a value representative of a channel designation, such as a UMTS (Universal Mobile Telecommunication System) Absolute Radio Frequency Channel Number (UARFCN). In any transceiver, the receiver will only be receiving a minimal subset of frequencies. These frequencies will be known apriori, either by command through an air interface protocol configuration or by the mobile device arbitrarily selecting a frequency of reception. In particular, the transceiver will only be receiving one of these frequencies at any one time. Accordingly, the controller logic module 210 may be arranged to receive information identifying the frequency that is being received.

The controller logic module 210 may be arranged to select a data rate sequence from a set of predetermined data rate sequences, the set of predetermined data rate sequences corresponding to a set of frequencies, such as a set of RF channel frequencies. In particular, for the example of a embodiment illustrated in FIG. 2, the controller logic module 210 comprises baud control logic module 230 arranged, upon receipt of data frames to transmit across the interface 215, to determine a critical frequency from information 280 provided thereto. The controller logic module 210 further identifies a baud rate sequence corresponding to the critical frequency from a lookup table 240, and configures the transmission of the data frames across the interface 215 according to the identified baud rate sequence. Table 1 below illustrates an example of baud rate sequences, comprising baud rates for the transmission of data frames across the interface 215, corresponding to a set of RF frequencies that lookup table 240 may comprise.

TABLE 1

| FREQUENCY | BAUD RATE SEQUENCE |
|---|---|
| 750 MHz | [832; 832; 832; 2496; 832; 832; 2496] Mbs |
| 900 MHz | [832; 2496; 832; 1248; 832; 832; 2496; 832] Mbs |
| 950 MHz | [1248; 832; 832; 1248; 1248; 1248; 832] Mbs |
| 1500 MHz | [1248; 832; 832; 832; 1248; 1248; 1248] Mbs |
| 1800 MHz | [832; 832; 832; 2496; 832; 2496; 832] Mbs |
| 2100 MHz | [624; 2496; 2496; 2496; 2496] Mbs |

The first column of Table 1 contains a set of RF frequencies, such as those corresponding to RF receiver channels. In alternative embodiments, Table 1 may comprise UMTS Absolute Radio Frequency Channel Numbers (UARFCNs). The second column of Table 1 comprises data rate sequences, which for the illustrated embodiment comprise baud rate sequences. In this manner, when the controller logic module 210 receives critical RF frequency information, for example a value representative of an actual frequency of the critical RF channel or a value representative of a channel designation such as a UARFCN, the baud rate sequence corresponding to that critical RF frequency may be obtained from the lookup table 240. The controller logic module 210 may then reconfigure the baud rate for the transmission of data frames across the interface 215, in accordance with the obtained baud rate sequence.

By way of example, suppose the controller logic module 210 receives information identifying the critical RF channel frequency as, say, 900 MHz. The controller logic module 210 may then retrieve the appropriate baud rate sequence from the lookup table 240, for example [832; 2496; 832; 1248; 832; 832; 2496; 832] Mbs. The controller logic module 210 then re-configures the transmission of the data frames across the interface 215 according to this baud rate sequence. Thus, the controller logic module 210 configures the baud rate for the transmission of the first data frame at 832 Mbs. After the first data frame has been transmitted, the controller logic module 210 reconfigures the baud rate for the transmission of the second data frame as 2496 Mbs. Similarly, after the second data frame has been transmitted, the controller logic 210 reconfigures the baud rate for the transmission of the third data frame as 832 Mbs. In this manner, the controller logic 210 reconfigures the baud rate between each data frame (if required according to the baud rate sequence) until all data frames have been transmitted. If the last baud rate in the sequence is configured before the last data frame to be transmitted, the controller logic module 210 may revert back to the first baud rate in the sequence, and continues to loop through the sequence until all the data frames have been transmitted.

If the controller logic module 210 subsequently receives information identifying a new critical RF channel frequency, such as, say, 1800, the controller logic module 210 is then able to retrieve the appropriate data rate sequence for the new critical frequency from the lookup table 240, for example [832; 832; 832; 2496; 832; 2496; 832] Mbs. The controller logic module 210 is then able to configure the transmission of data frames across the interface 215 according to this new data rate sequence.

Advantageously, by selecting the data rate sequence from a set of predetermined data rate sequences in this manner, whereby the set of predetermined data rate sequences corresponds generally to a set of critical frequencies, the controller logic module 210 is able to dynamically change the data rate sequence in response to changes in the critical frequency. In this manner, when the wireless communication unit changes frequency channels, the controller logic module 210 is able to dynamically change the data rate sequence accordingly, and thereby manage the frequency spectrum of the data signal being transmitted across the interface.

In accordance with some example of a embodiments of the invention, for ease of implementation and to minimise costs, each data rate within a data rate sequence substantially comprises an integer division of a reference timing signal 255 generated by a Phase Locked Loop (PLL) logic 250. For example, in the case of the data rates within Table 1 above, the PLL logic module 250 may be arranged to generate a reference timing signal 255 comprising a frequency of 2496 MHz, which can be divided by integers to produce clock signals comprising the data rate frequencies of 2496 MHz, 1248 MHz, 832 MHz, 624 MHz, etc.

Accordingly, for the example of a embodiment illustrated in FIG. 2, the controller logic module 210 is operably coupled to frequency divider logic module 290, which receives the reference timing signal 255 generated by the PLL logic module 250, and divides the reference timing signal 255 by an integer in accordance with a divide ratio 235 from the controller logic module 210. In this manner, the divider logic module 290 generates a data rate signal 295, which is provided to the interface logic module 220, and which acts as a timing reference for the transmission of data across the interface 215.

Figure 3:
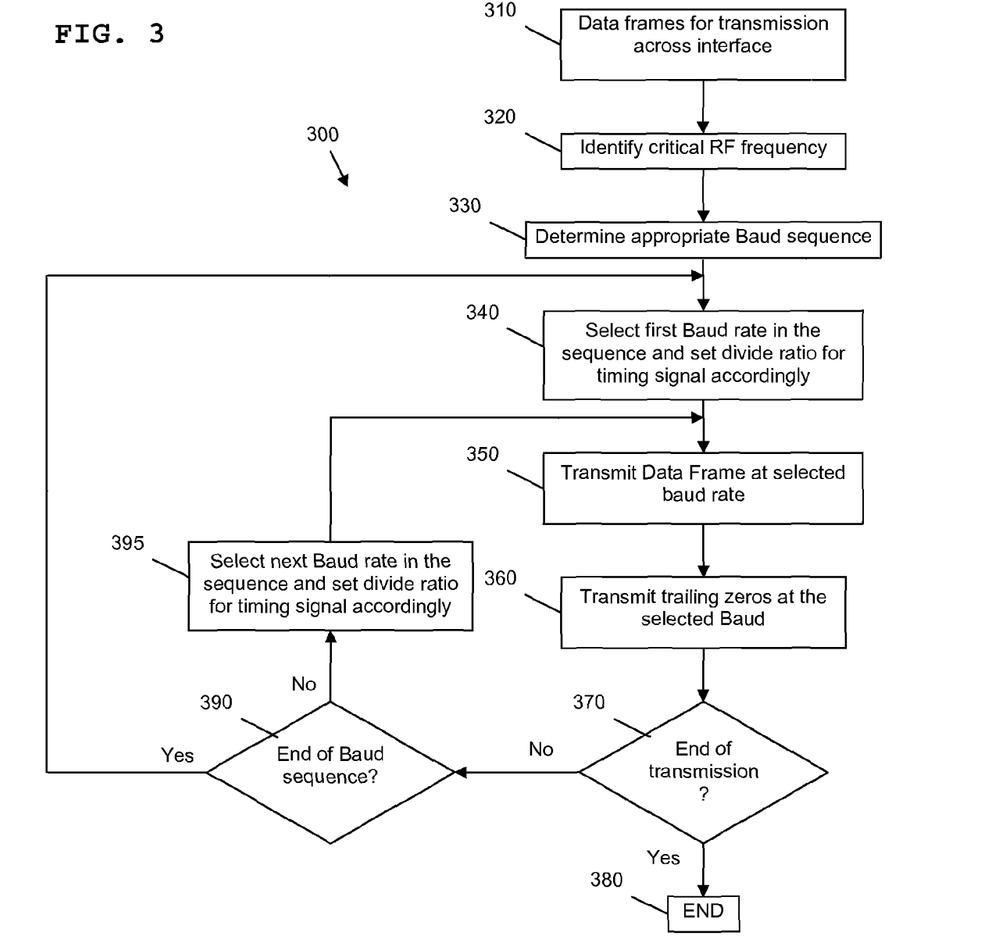
FIG. 3 illustrates an example of a simplified flowchart of an example of a method for transmitting data frames across an interface.

Referring now to FIG. 3 there is illustrated an example of a simplified flowchart 300 of an example of a method for transmitting data frames across an interface. For example, the method of FIG. 3 may be implemented within a wireless communication unit, such as the wireless communication unit of FIG. 1. In particular, the method of FIG. 3 may be implemented in the form of computer-readable code for programming a signal processing logic module, such as the signal processing logic module 108.

The method starts at step 310 with a receipt (e.g. from an external source) or generation (e.g. internally) of data frames to be transmitted across the interface. A critical RF frequency is then identified, in step 320, followed by a determination of a data rate sequence in step 330. For example, the critical RF frequency identified in step 320 may be used to obtain an appropriate data rate in a form of a baud rate from a lookup table.

Next, in step 340, the first data rate in the data rate sequence is selected and a divide ratio is set for a timing signal according to the first data rate in the data rate sequence. The first data frame is transmitted at the selected data rate, in step 350, followed by the transmission of trailing zeros, if necessary, in step 360. Next, in step 370, it is determined whether the end of the transmission has been reached, e.g. the last data frame has been transmitted. If the end of the transmission has been reached, the method ends at step 380.

However, if the end of the transmission has not been reached, the method moves to step 390, where it is determined whether the end of the data rate sequence has been reached. If the end of the data rate sequence has not been reached, the method moves to step 395 where the next data rate in the sequence is selected, and the divide ratio is set for the timing signal according to the selected data rate in the data rate sequence. The method then loops back to step 350, where the next data frame is transmitted at the selected data rate.

Referring back to step 390, if the end of the data rate sequence has been reached, the method loops back to step 340, where the first data rate in the sequence is selected, and the divide ratio is set for the timing signal according to the first data rate in the data rate sequence. The method then moves on to step 350, where the next data frame is transmitted at the selected data rate.

Figure 4:
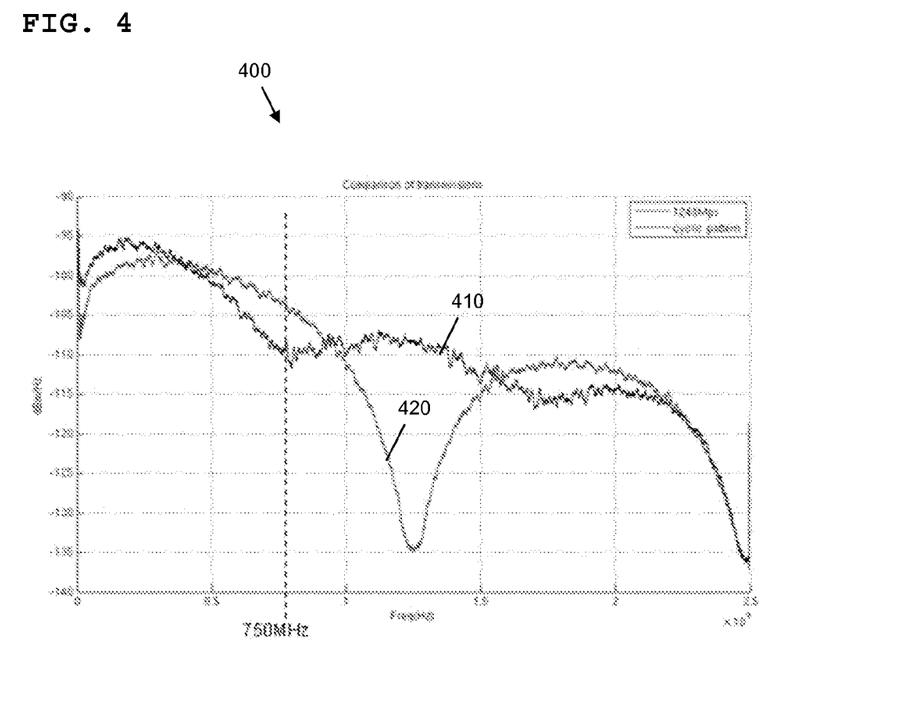
FIG. 4 illustrates an example of a frequency spectrum comparison for a data signal transmitted across a high speed interface.

Referring now to FIG. 4, there is illustrated an example of a frequency spectrum comparison 400 for a data signal transmitted across a high speed interface. The frequency spectrum comparison 400 comprises a first curve 410 representing a frequency spectrum for the data signal transmitted across the interface using a baud rate sequence in accordance with an example of a embodiment of the invention. The frequency spectrum comparison 400 further comprises a second curve 420 representing a frequency spectrum for the data signal transmitted across the interface using a fixed 1248 Mbs baud rate.

In particular, the illustrated curve 410 represents a frequency spectrum for the transmission of data across the interface using the baud rate sequence in Table 1 above corresponding to a critical frequency of 750 MHz. Thus, the curve 410 represents the frequency spectrum for the transmission of data across the interface using a cyclic baud rate of: [832; 832; 832; 2496; 832; 832; 2496] Mbs. As can be seen, approximately 7 dB of performance improvement at 750 MHz is achieved over the fixed baud rate, with poor performance being pushed out to other regions of the spectrum, whilst maintaining the required >832 Mbs net data throughput without the need for additional data paths.

Table 2 below illustrates the performance enhancements achieved for each of the baud rate sequences of Table 1 above, in comparison to a fixed 1248 MHz baud rate.

TABLE 2

| FREQUENCY | BAUD RATE SEQUENCE | Performance Enhancement |
| --- | --- | --- |
| 750 MHz | [832; 832; 832; 2496; 832; 832; 2496] Mbs | 7.414 dB |
| 900 MHz | [832; 2496; 832; 1248; 832; 832; 2496; 832] Mbs | 3.3474 dB |
| 950 MHz | [1248; 832; 1248; 1248; 1248; 832] Mbs | 2.78 dB |
| 1500 MHz | [1248; 832; 832; 832; 1248; 1248; 1248] Mbs | 2.2609 dB |
| 1800 MHz | [832; 832; 832; 2496; 832; 2496; 832] Mbs | 5.1283 dB |
| 2100 MHz | [624; 2496; 2496; 2496; 2496] Mbs | 3.9371 dB |

As can be seen, a performance enhancement is achieved for each of the critical frequencies over the fixed 1248 Mbs baud rate, without the need for additional data paths.

Clock data recovery circuits (not shown) may be provided at a downstream side of the interface 215 that determine what baud the data is sent on from the received bit stream. However, it is contemplated that the baud rate sequences may alternatively be pre-programmed into downstream interface logic (not shown).

It will be understood that the method and apparatus for transmitting data frames across an interface, as described above, aim to provide at least one or more of the following:

(i) Dynamic management of data transfer rates for sequential frames, in order to shape the RF spectrum of the data signal on the interface at critical frequencies;

(ii) RF spectrum of the data signal on the interface is shaped to reduce interference at RF critical frequencies, and dynamically managing this RF spectrum shaping as a wireless communication unit moves to different RF frequencies; and (iii) A low cost implementation leading to improved interface performance leading to a more robust system, where a high data rate interface may be used substantially without degrading receiver performance.

Whilst within example of a embodiments of the invention the interface may comprise a single data lane, it will be understood that the invention may equally be implemented in conjunction with an interface comprising a plurality of data lanes. For example, a single data rate may be applied to all data lanes. Accordingly, the data rate applied concurrently to each data lane will follow the same data rate sequence. Alternatively, a separate data rate sequence may be applied to each individual data lane such.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

The semiconductor substrate described herein can be any semiconductor material or combinations of materials, such as gallium arsenide, silicon germanium, silicon-on-insulator (SOI), silicon, monocrystalline silicon, the like, and combinations of the above.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an example of a wireless communication unit architecture, this example of a architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely example of a, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected," or "operably coupled," to each other to achieve the desired functionality.

Also for example, in one embodiment, the illustrated elements of FIG. 2 comprise logic located on a single integrated circuit or within a same device. Alternatively, system may include any number of separate integrated circuits or separate devices interconnected with each other. Furthermore, logical components may be soft or code representations of physical circuitry or of logical representations convertible into physical circuitry.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received or stored in computer readable media such as memory 116. Such computer readable media may be permanently, removably or remotely coupled to the signal processing logic 108. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Also, devices functionally forming separate devices may be integrated in a single physical device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A semiconductor device comprising:
   an interface logic module for transmitting data frames across an interface; and
   a controller logic module arranged to:
      control a rate at which the interface logic module transmits data frames across the interface;
      receive data frames to transmit across the interface; and
      upon receipt of data frames to transmit across the interface, the controller logic is further arranged to determine a sequence of data rates, based on a critical frequency of a communication channel, with which to transmit sequential data frames across the interface, and to configure the transmission of the data frames across the interface according to the determined sequence of data rates, wherein at least one data rate of the determined sequence of data rates is different from the other data rates in the determined sequence of data rates, wherein a first data frame is transmitted at a first data rate of the determined sequence of data rates and each sequential data frame is transmitted across the interface at a corresponding sequential next data rate of the determined sequence of data rates.

2. The semiconductor device of claim 1 wherein the critical frequency comprises a Radio Frequency (RF) channel frequency of the communication channel.

3. The semiconductor device of claim 1 wherein the controller logic module is further arranged to select the determined sequence of data rates from a set of predetermined sequences of data rates, wherein each predetermined sequence of the set of predetermined sequences of data rates corresponds to a respective critical frequency of a set of critical frequencies.

4. The semiconductor device of claim 3 wherein, upon receipt of the data frames to transmit across the interface, the controller logic module is further arranged to:
   determine a critical frequency from the set of critical frequencies;
   identify a sequence of data rates corresponding to the critical frequency from a lookup table; and
   perform said configuring the transmission of the data frames across the interface according to the identified sequence of data rates.

5. The semiconductor device of claim 1 wherein the control logic module is further arranged to reconfigure the data rate for the transmission of data frames across the interface in accordance with the sequence of data rates between data frames.

6. The semiconductor device of claim 1 wherein each data rate within the sequence of data rates comprises an integer division of a reference timing signal.

7. The semiconductor device of claim 6 wherein the reference timing signal is generated by a Phase Locked Loop (PLL).

8. A wireless communication unit comprising the semiconductor device of claim 1.

9. A method for transmitting data frames across an interface, the method comprising:
   receiving a plurality of data frames to transmit across the interface;
   determining a sequence of data rates, based on a critical frequency of a communication channel, with which to transmit sequential data frames of the plurality of data frames across the interface, wherein at least one data rate of the determined sequence of data rates is different from the other data rates in the determined sequence of data rates; and
   configuring transmission of the data frames across the interface according to the determined sequence of data rates.

10. The method of claim 9 wherein the critical frequency comprises a radio frequency (RF) channel frequency of the communication channel.

11. The method of claim 9 further comprising:
   selecting the sequence of data rates from a set of predetermined sequences of data rates, wherein
      each predetermined sequence of the set of predetermined sequences of data rates corresponds to a corresponding critical frequency of a set of critical frequencies.

12. The method of claim 11 further comprising:
   upon said receiving the plurality of data frames,
      determining a critical frequency of the set of critical frequencies,
      identifying, from a lookup table, a sequence of data rates corresponding to the critical frequency, and
      performing said configuring the transmission of data frames across the interface according to the identified sequence of data rates.

13. The method of claim 9 further comprising:
   reconfiguring the data rate for transmission of data frames across the interface in accord with the sequence of data rates between data frames.

14. The method of claim 9 wherein each data rate within the sequence of data rates comprises an integer division of a reference timing signal.

15. A non-transitory computer-readable storage element storing program code executable by a signal processing logic, the program code configured to:
   receive data frames to transmit across an interface;
   determine a sequence of data rates, based on a critical frequency of a communication channel, with which to transmit sequential data frames across the interface, wherein at least one data rate of the determined sequence of data rates is different from the other data rates in the determined sequence of data rates; and
   configure transmission of the data frames across the interface according to the determined sequence of data rates.

16. The computer readable storage element of claim 15 storing program code further configured to:
   select the determined sequence of data rates from a set of predetermined sequences of data rates, wherein
   each predetermined sequence of the set of predetermined sequences of data rates corresponds to a corresponding critical frequency of a set of critical frequencies.

17. The computer readable storage element of claim 16 storing program code further configured to:
   upon said receiving the plurality of data frames,
      determine a critical frequency of the set of critical frequencies,
      identify, from a lookup table, a sequence of data rates corresponding to the critical frequency, and
      perform said configuring the transmission of data frames across the interface according to the identified sequence of data rates.

18. The computer readable storage element of claim 15 wherein the critical frequency comprises a radio frequency (RF) channel frequency of the communication channel.

19. The computer readable storage element of claim 15 storing program code further configured to:
   reconfigure the data rate for transmission of data frames across the interface in accord with the sequence of data rates between data frames.

20. The computer readable storage element of claim 15 wherein each data rate within the sequence of data rates comprises an integer division of a reference timing signal.

\* \* \* \* \*